United States Patent
Barreto et al.

(10) Patent No.: US 10,316,241 B2
(45) Date of Patent: *Jun. 11, 2019

(54) FLUID COMPOSITION FOR STIMULATION IN THE FIELD OF OIL OR GAS PRODUCTION

(71) Applicant: Arkema France, Colombes (FR)

(72) Inventors: Gilles Barreto, Messimy (FR); Raber Inoubli, Pau (FR)

(73) Assignee: ARKEMA FRANCE, Colombes (FR)

(*) Notice: Subject to any disclaimer, the term of this patent is extended or adjusted under 35 U.S.C. 154(b) by 0 days.

This patent is subject to a terminal disclaimer.

(21) Appl. No.: 15/879,832

(22) Filed: Jan. 25, 2018

(65) Prior Publication Data

US 2018/0148634 A1 May 31, 2018

Related U.S. Application Data

(63) Continuation of application No. 15/035,584, filed as application No. PCT/FR2014/052912 on Nov. 14, 2014, now Pat. No. 10,000,689.

(30) Foreign Application Priority Data

Nov. 14, 2013 (FR) ..................... 13 61114

(51) Int. Cl.
*C09K 8/68* (2006.01)
*E21B 43/267* (2006.01)
(Continued)

(52) U.S. Cl.
CPC .............. *C09K 8/68* (2013.01); *C09K 8/685* (2013.01); *C09K 8/725* (2013.01); *C09K 8/88* (2013.01);
(Continued)

(58) Field of Classification Search
CPC ...... C09K 8/68; C09K 8/882; C09K 2208/08; C09K 8/725; E21B 43/04; E21B 43/26; E21B 43/267
See application file for complete search history.

(56) References Cited

U.S. PATENT DOCUMENTS 4,488,975 A 12/1984 Almond
4,579,670 A 4/1986 Payne
(Continued)

FOREIGN PATENT DOCUMENTS

WO 2012085415 6/2012
WO 2012085473 6/2012

OTHER PUBLICATIONS

International Serach Report and Written Opinion for Internation Application No. PCT/FR2014/052912, dated Mar. 16, 2015, 10 (pages). 2015.
(Continued)

Primary Examiner — Zakiya W Bates
(74) Attorney, Agent, or Firm — RatnerPrestia (57) ABSTRACT

The present invention relates to filamentous polymer particles useful in oil, condensate or gas recovery from subterranean locations as hydraulic fracturing fluids, diverting fluids, fluids that make it possible to improve the distribution and the flow profiles of the fluids or products injected (referred to as conformance fluids) or permeability control fluids, sand control gravel pack placement fluids, acid fracturing fluids, and the like. These fluids are stimulation fluids injected in wells which serve also as producing wells for the hydrocarbons initially present in the subterranean formations.

10 Claims, 1 Drawing Sheet (51) Int. Cl.
*C09K 8/88* (2006.01)
*C09K 8/72* (2006.01)
*E21B 43/26* (2006.01)
*E21B 43/04* (2006.01)

(52) U.S. Cl.
CPC .............. *C09K 8/882* (2013.01); *C09K 8/887* (2013.01); *E21B 43/26* (2013.01); *E21B 43/267* (2013.01); *C09K 2208/08* (2013.01); *C09K 2208/10* (2013.01); *E21B 43/04* (2013.01)

(56) References Cited

U.S. PATENT DOCUMENTS

| | | | |
|---|---|---|---|
| 5,305,832 | A | 4/1994 | Gupta |
| 6,637,517 | B2 | 10/2003 | Samuel |
| 8,347,960 | B2 | 1/2013 | Mothersbaugh |
| 2006/0157248 | A1 | 7/2006 | Hoefer |
| 2007/0207182 | A1 | 9/2007 | Weber et al. |
| 2007/0213232 | A1 | 9/2007 | Hartshorne |
| 2009/0111716 | A1 | 4/2009 | Hough |
| 2013/0252854 | A1 | 9/2013 | Abe |
| 2013/0338315 | A1 | 12/2013 | Magnet |
| 2014/0039067 | A1 | 2/2014 | Magnet |

OTHER PUBLICATIONS

Kefi et al. in "Expanding Applications for Viscoelastic Surfactants", Oilfeild Review, Winter 2004/2005, pp. 10-23 2005.

P. E. Dresel and A. W. Rose (Pennsylvania Geological Survey, Fourth Series, Harrisburg, (2010) 2010.

Development of the Natural Gas Resources in the Marcellus Shale, National Park Service, U.S. Department of the Interior, Nov. 2009, http://marcellus.psu.edu/resources/PDFs/brinespdf, 28 pages. 2009.

FLUID COMPOSITION FOR STIMULATION IN THE FIELD OF OIL OR GAS PRODUCTION

CROSS-REFERENCE TO RELATED APPLICATIONS

This application is a continuation of U.S. application Ser. No. 15/035,584, filed May 10, 2016, which is the national phase of International Application No. PCT/FR2014/052912, filed 14 Nov. 2014, which claims priority from French Application No. 1361114 filed 14 Nov. 2013. The disclosure of each of these applications is incorporated herein by reference in its entirety for all purposes.

FIELD OF THE INVENTION

The present invention relates to filamentous polymer particles useful in oil, condensate or gas recovery from subterranean locations as hydraulic fracturing fluids, diverting fluids, fluids that make it possible to improve the distribution and the flow profiles of the fluids or products injected (referred to hereinbelow as conformance fluids) or permeability control fluids, sand control gravel pack placement fluids, acid fracturing fluids, and the like. These fluids are stimulation fluids injected in wells which serve also as producing wells for the hydrocarbons initially present in the subterranean formations.

BACKGROUND OF THE RELATED ART

Fracturing fluids are today commonly used to fracture the rocks in order to enable or increase the fluids communication between the subterranean formation and the wells. The fluids present in the subterranean formation include water containing salts, gas, condensates and oil. Without the use of fracturing fluids, some rocks, which have a very low permeability, are unable to produce hydrocarbons like the ones associated with shale oil and shale gas. Some other rocks already produce hydrocarbons but it is desired to increase their output. To maintain the fractures opened, some solid particles, the "proppants", are dispersed into the fluid above the surface and transported to the fractures during a pumping operation. The proppants are led and placed between the walls of the fractures.

To transport the proppants it is necessary that the fracturing fluid have a shear thinning behaviour: high viscosity at low shear so that the proppants do not settle in low turbulence areas of the injection system and in the subterranean formation and low viscosity at high shear to reduce the power necessary to pump the fracturing fluid.

By "shear thinning" is meant the diminution of the viscosity under the effect of an increase in the stress, the shear, and/or the deformation that are applied to the system under study.

Acid fracturing is a technique used to dissolve rocks in order to increase the permeability to hydrocarbons. In a first step a viscous water solution is injected into the subterranean formation to break the rocks, to create the desired fracture height, width, and length. Once the desired values of created fracture dimensions are achieved, the acid is pumped and fingers down the fracture to etch the walls of the fracture to create fracture conductivity. Then the fluids are pumped back to the surface with the same well and the pumping of the hydrocarbons begins. The acid is normally viscous or gelled or crosslinked or emulsified to maintain fracture width and minimize fluid leak off, with shear thinning behaviour. The most commonly used fluid in acid fracturing is 15% hydrochloric acid (HCl). To obtain more acid penetration and more etching, more concentrated HCl solution is sometimes used as the primary acid fluid.

If needed, formic acid (HCOOH) or acetic acid ($CH_3COOH$) are used because the dissolving reaction between these acids and the rocks is more easily inhibited under high-temperature conditions. Hydrofluoric acid (HF) can also be used to etch subterranean sandstone formations. As the etching happens, the salts content of the water increases. To reduce the water leak off inside the rock porosity during etching, it is necessary that the viscosifying additive keeps its function while salt content increases.

Diverting fluids, conformance and permeability control fluids aim at decreasing the permeability of some parts of the subterranean formation. The formations possess sometimes valuable zones containing hydrocarbons but with different permeabilities or different water volume fractions. In such a case and when additional pressure is put into the subterranean formation with the injection of water to produce hydrocarbons, it happens sometimes that the water injected finds the fastest way to reach the producing wells, that is to say that it passes through zones with a high water volume fraction in the voids and/or with a high permeability, hence flowing around other hydrocarbon rich zones without pushing them towards the producing wells.

The conformance and permeability control fluids are injected in such high permeability and/or high water content zones to replace the fluids in place and reduce their permeability to water thanks to their high viscosity. High viscosity at low shear is necessary so that the slowly moving fluids coming from upstream cannot penetrate and low viscosity at high shear is necessary to reduce the power necessary to pump the conformance and permeability control fluids. The diverting fluids are injected in high permeability and/or high water content zones to replace the fluids in place and reduce their permeability to water thanks to their high viscosity. High viscosity at low shear is necessary so that the slowly moving fracturing fluids injected afterwards cannot penetrate and low viscosity at high shear is necessary to reduce the power necessary to pump the diverting fluid.

To control the production of sand coming from the subterranean formation with the hydrocarbons, one technique consists in placing a specific sized gravel pack in the annular space between the reservoir rock and the production assembly. The gravel acts as a filter allowing the formation fluids to flow from the formation to the production string while filtering out sand grains and other formation fines. To transport the gravel it is necessary that the sand control gravel pack placement fluid have a shear thinning behaviour: high viscosity at low shear so that the gravel does not settle in low turbulency areas of the injection system and low viscosity at high shear to reduce the power necessary to pump the placement fluid.

To control the viscosity of the abovementioned fluid, the prior art teaches that hydrophilic polymers are added to the water. Said polymers include polygalactomannan, guar or polymers derived from guar such as for example carboxymethylguar, hydroxyethylguar, hydroxypropylguar. Examples are given in the following patents: U.S. Pat. Nos. 5,305,832, 4,488,975, and 4,579,670.

However these polymers have drawbacks, e.g. the long time necessary for complete hydration in water, and the partial plugging of the created porosity because of their adsorption on the walls of the fractures. Other solutions exist to avoid these problems, using viscoelastic surfactants. Kefi et al. in "*Expanding applications for viscoelastic surfac-* tants", Oilfield Review, Winter 2004/2005, pp 10-23, provides for an overview of the potential use of viscoelastic surfactants in the oil and gas industry and compares them with hydroxyethylcellulose for fracturing fluids. Viscoelastic fluids save energy because of the higher shear thinning ability. U.S. Pat. No. 6,637,517 and US2007/0213232 give examples of such viscoelastic fracturing fluids.

To help protection against chemical decomposition of these additives, known oxygen scavengers can be used such as sodium thiosulfate, methanol, thiourea, sodium thiosulfite. Other additives such as pH buffers, wetting agents, foamers, corrosion inhibitors, defoamers or antifoams, scale inhibitors, biocides, crosslinkers, gel breakers, non-emulsifiers, fluid loss control additives can be used. A gas can also be injected to produce gas bubbles inside the fracturing fluid such as nitrogen and carbon dioxide.

Clay stabilizers are used to prevent the swelling and/or dislodging of clays within the formation. The formation contains water which is equilibrated from the thermodynamic point of view with the rocks. Hence it has salts dissolved in it. The cations of these salts are equilibrated between the water phase and the clays. If the injected water has not enough cations dissolved in it, when it comes into contact with the rocks of the formation, the cations present inside the sheets of the clays diffuse into the injected water, leaving the sheets with a lower cationic charge. As a consequence the sheets which are negatively charged will repel each other and the clays are said to swell limiting the permeability which was created by the fractures.

Hence it is necessary to have enough salt inside the injected water to avoid this non equilibrated diffusion of cations between water and clays. What's more the dissolved salts act on the viscosity of the fracturing fluid.

The most common clay stabilizers are KCl, NaCl, quaternary ammonium salts such as $NH_4Cl$, used at a dosage of from about 1% to about 5% by weight.

High volumes of water are necessary for hydraulically fracturing subterranean formations. Some areas where shale gas or oil is present have high constraints on the supply of water e.g. Texas, other places have farming lands or living places in the neighbourhood, making necessary a high quality for the treatment of the flow back fluids pumped back to the surface after the fracturing operations are run and before these waters are released, discharged. What's more these huge quantities of water are hauled. This adds impact on the environment through emissions for constructing the road network and hauling of water. It is thus highly desirable to reduce the consumption of water and increase the recycling of water for hydraulic fracturing operations. Recycling water means dealing with water containing high amounts of salts, such as NaCl, KCl, $CaCl_2$, $BaCl_2$, and the like.

US2009111716 teaches water soluble polymers, especially polyelectrolytes that are sensitive to salts in terms of rheology breakdown with salt increase and describes a solution to increase the salt resistance of water soluble polymers comprising a water soluble polymer, zwitterionic surfactants and inorganic salts and their use as hydraulic fracturing fluid. FIG. 8 of US2009111716 shows the impact of 5 wt % KCl on the viscosity of a 0.3% anionic guar water solution as a function of shear rate. The viscosity without KCl ranges from 0.4 Pa·s to 0.5 Pa·s and is equal to 0.09 Pa·s with a concentration of 5 wt % KCl at a shear rate of $0.1$ $s^{-1}$. The decrease is thus 75%. The addition of 2% of a given surfactant enables an increase of viscosity of 0.35 Pa·s at 0.1 $s^{-1}$ in the presence of 5 wt % KCl. However this patent does not describe what is the sensitivity of the polymer/surfactant mixture as a function of KCl concentration and the addition of the surfactant is another step to prepare the fracturing fluid.

P. E. Dresel and A. W. Rose (Pennsylvania Geological Survey, Fourth Series, Harrisburg, (2010) pp. 11-12, http://www.marcellus.psu.edu/resources/PDFs/brines.pdf) teach that the formation waters present in oil and gas fields in Pennsylvania are difficult to analyze because sometimes the amount produced is very low so the data are not available or of bad quality.

P. E. Dresel and A. W. Rose (ibid.) also teach that the salts content in formation water can greatly vary in Pennsylvania from 7% w/v to 35% w/v and also in short distances of from 2 to 3 kilometers, for example for points 19 and 21 on the chart of page 11 for a sodium concentration ranging from 3 g/L to 17.4 g/L and for a calcium concentration ranging from 0.9 g/L to 6.1 g/L. If we consider that sodium and calcium are associated with chloride which is always the dominant anion, the variations in terms of NaCl and $CaCl_2$ are respectively from 7.5 g/L to 44 g/L and from 2.5 g/L to 16.8 g/L. For these points 19 and 21, the calculated total amount of dissolved solids varies between 1% and 6.7%. It means that the choice of the fracturing fluid salt content is difficult and the common hydraulic fracturing fluid can be below the salinity of formation water expressed in terms of total dissolved solids.

On the one hand it is better not to be too low in salt content to avoid clay swelling anywhere in the formation accessible with the wells which reduces the permeability, and on the other hand having a high salt content means a reduced viscosity with polyelectrolytes and a reduced transport of proppants. In both cases the efficiency of the fracturing operation is reduced because of salts and a high quantity of water is necessary to fracture. It would be beneficial to work with a high salt content for the sake of avoiding clay swelling with shear thinning additives able to withstand these salt levels.

US2007213232 teaches the addition of an amine or alcohol to a viscoelastic gel in order to increase the critical temperature at which the viscosity starts to fall. This solution is said to be of value to get rid of the salt while maintaining the same viscosity. However FIG. 8 of US2007213232 shows the sensitivity of the claimed fluids to KCl in terms of viscosity at a shear rate of 1 $s^{-1}$.

WO2012/085415 describes the preparation of specific filamentous particles by controlled radical emulsion polymerization of hydrophobic monomers, using as initiators living nitroxide-derived macroinitiators. The particles can be crosslinked. An other item described in US2007213232 is a direct technique for preparing filamentous particles that does not necessitate the use of an organic co-solvent. Filamentous polymeric aggregates are said to have an increasing attractiveness especially in biomedical applications as systems for administering drugs. These filamentous polymeric particles are exemplified with 35 g/L of NaCl in water. However no use in oil and gas extraction from subterranean reservoirs is described.

WO2012/085473 describes the increase of viscosity of water injected in a well for enhanced recovery of hydrocarbons with the help of a specific filamentous polymeric particles. The injected aqueous phase maintains the pressure in the reservoir and displaces the hydrocarbons toward the production wells. The particles can be crosslinked. The form and structure of the filamentous polymeric particles according to WO2012/085473 are maintained in a dispersed medium, independently of their concentration in the medium, of variations in its pH or its salinity.

The example given in FIG. 10 has a NaCl concentration of 35 g/L of water. Hence WO2012/085473 teaches that the polymer particle form and structure are not modified till a salinity of 35 g/L (3.5%) of NaCl. The mass fraction of particles is between 100 ppm and 10 000 ppm (that is a maximum of 1%). The term "brine" is employed but without definition so it is unknown what is the behaviour with a higher amount of salt or different salts and a higher amount of particles.

WO2012/085473 does not show rheology modification depending on the salt concentration because it teaches that the form and structure are not modified with salt. WO2012/085473 claims a method of enhanced hydrocarbon extraction. It means the rocks already produce some hydrocarbons and the technique claimed increases the output. The method of the above cited invention is implemented by means of a polymeric additive, wherein said additive is mixed with water or brine in a proportion of at least 500 ppm of additive and then this mixture is injected under pressure into the rock.

However it is not mentioned that the pressure is high enough to fracture the subterranean rocks and that proppants are used. Moreover the use of injection and production wells is mentioned, however not mentioned is the fact that each well can be alternatively used for injection of a water solution and production of hydrocarbons.

U.S. Pat. No. 8,347,960 describes an electro-coagulation treatment above the surface of the flow back water or source water coming from a hydraulic fracturing operation to remove the contaminants, re-use the water and to reduce the hauling of water. This process enables the recycling of water for following hydraulic fracturing operations. However it is said that chloride and sodium contaminants are not reduced by this process. The other contaminants are retrieved from the flow back water but must be disposed of.

There is therefore a need for a shear thinning hydraulic fracturing fluid containing proppants the viscosity of which at low shear rate (for example $0.1\ s^{-1}$ to $1\ s^{-1}$) decreases more slowly than the viscosity of existing fluids or even increases when its salt content increases up to 30% with the salts typically found in formation water, at constant concentration of shear thinning additive.

This lower sensitivity would enable an increase of the salt content like for example NaCl, KCl, $CaCl_2$, $BaCl_2$, and/or ammonium salts in the hydraulic fracturing fluid while keeping a shear thinning behaviour. Furthermore, the density of the fluid would be increased which would increase the pressure in the subterranean formation at constant pumping power and hence the fracturing efficiency.

What's more, as the formation water can have different salinities at different locations of a same subterranean reservoir and as the formation water mixes with the hydraulic fracturing fluid thereby modifying its salinity and as the salinity would have a lower impact on the new hydraulic fracturing fluid viscosity at low shear rates (for example $0.1\text{-}1\ s^{-1}$) than for conventional fluids, then the viscosity of the new fracturing fluid would have a lower reduction and hence the ability of the new hydraulic fracturing fluid to transport proppants inside the fractures would be greater and the fractures would be kept open wider or this would reduce the amount of water and fracturing additives necessary to deliver the same amounts and flow rates (output) of hydrocarbons.

This lower sensitivity or reversed sensitivity (in the case of viscosity increase upon salt addition) would make it possible also to reuse the flow back water which is a mixture of hydraulic fracturing fluid and formation water for the following fracturing operations, that is as a true recycling operation:

1—for example starting from an amount of salt in the fracturing fluid close to the estimated formation water salt content which is usually high (above 5 wt %), the viscosity of the flow back fluid decreases essentially due to dilution of shear thinning additive. It is then necessary to add the lacking concentration of shear thinning additive. In the case of a hydraulic fracturing fluid of the prior art, as the viscosity is low at high salinity and because of dilution by formation water, the relative lacking concentration is higher than for the filamentous polymeric particles that have a lower sensitivity to salt.

2—for example starting from an amount of salt in the fracturing fluid lower than the estimated formation water salt content, and using a shear thinning additive having an inverse sensitivity to salt, the viscosity of the flow back fluid will decrease due to dilution of the shear thinning additive. But this effect will be limited due to the increase in salt content coming from the formation water and which tends to increase the viscosity.

After having increased its viscosity by adding additives, the reuse of the flow back water, coming from the mixture of known hydraulic fracturing fluids or coming from the hydraulic fracturing fluid mixture which could solve the salinity issue described above, with formation water without separating contaminants such as salts would be beneficial from several points of view: less energy would be used and these contaminants would stay at the fracturing site or below, limiting the dissemination due to hauling.

SUMMARY OF THE INVENTION

In the case of diverting fluids, conformance or permeability control fluids, sand control gravel pack placement fluid, acid fracturing fluids, there is the same need for a shear thinning fluid (containing gravel in the case of sand control gravel pack placement fluid) the viscosity of which at low shear rate ($0.1\ s^{-1}$ to $1\ s^{-1}$) decreases more slowly than the viscosity of existing fluids or even increases when its salt content increases up to 30% with the salts typically found in formation water, at constant concentration of the shear thinning additive.

DETAILED DESCRIPTION OF CERTAIN EMBODIMENTS OF THE INVENTION

A first subject of the present invention is a composition comprising water, dissolved salts, filamentous polymeric particles and solid particles. The salts can be mineral salts such as the ones found in subterranean formation water like NaCl, KCl, $MgCl_2$, $CaCl_2$, $SrCl_2$, $BaCl_2$, or synthetic salts such as ammonium salts. The solid particles may be specific solid particles called proppants by those skilled in the art and are small inorganic particles, e.g. rock particles, for example sand, gravel, coated sand, bauxite, ores, tailings, or metal particles. The filamentous polymeric particle synthesis and structure are described in the applications WO 2012/085415 and WO 2012/085473 and are given here below.

According to a preferred embodiment, in the composition of the present invention, the weight percentage of filamentous polymeric particles compared to the weight of the composition without the solids and proppants is between 0.05% and 20% and the weight percentage of dissolved salts ranges from 0.1% to salt saturation concentration.

According to another embodiment, the present invention relates to a composition comprising water, dissolved salts, filamentous polymeric particles and dissolved acids, such as those described herein before. The dissolved salts can be mineral salts such as the ones found in subterranean formation water, e.g. mono-valent and/or di-valent and/or tri-valent ions, such as NaCl, KCl, $MgCl_2$, $CaCl_2$, $SrCl_2$, $BaCl_2$, or synthetic salts such as ammonium salts. The acids are chosen from among hydrochloric acid, hydrofluoric acid, formic acid, acetic acid. The filamentous polymeric particle synthesis and structure are described in applications WO2012/085415 and WO2012/085473 and are given here below.

The filamentous particles have a length/diameter ratio of more than 100, said particles being composed of block copolymers synthesized by controlled radical emulsion polymerization performed from at least one hydrophobic monomer in the presence of a water-soluble macro-initiator.

According to a first embodiment of the first two objects of the invention, said particles are synthesized from at least one hydrophobic monomer in the presence of a living macro-initiator derived from a nitroxide.

Said filamentous particles are characteristically obtained in aqueous medium from synthesis of said block copolymers performed by heating the reaction mixture at a temperature of 60° C. to 120° C., with a percentage of the molar mass of the hydrophilic macro-initiator in the final block copolymer of between 10% and 50%, the degree of conversion of the hydrophobic monomer being at least 50%. The initial pH of the aqueous medium may vary between 5 and 10. This direct technique for preparing filamentous particles does not require the use of an organic co-solvent.

A "living macro-initiator" is a polymer comprising at least one end suitable for re-engagement in a polymerization reaction by addition of monomers at appropriate temperature and appropriate pressure. Said macro-initiator is advantageously prepared by Controlled Radical Polymerization (CRP). A "water-soluble macro-initiator" is a polymer which is soluble in water and comprises at its end a reactive function capable of reinitiating a radical polymerization.

This macro-initiator is principally composed of hydrophilic monomers, these being monomers having one or more functions capable of establishing hydrogen bonds or ion-dipole interaction with water. In the case of the polymerization of a hydrophobic monomer, an amphiphilic copolymer will be formed, with a hydrophilic block composed of the macro-initiator, while the hydrophobic block will be obtained from the polymerization of the hydrophobic monomer or monomers.

According to one variant embodiment, said preformed water-soluble macro-initiator is added to the reaction medium comprising at least one hydrophobic monomer.

According to another variant within the first embodiment, said water-soluble macro-initiator is synthesized in the aqueous reaction medium in a preliminary step, without isolation of the macro-initiator formed and without removal of any residual hydrophilic monomers. This second variant is a "one-pot" polymerization reaction.

The hydrophobic monomers may be selected from the following monomers:
vinylaromatic monomers such as styrene or substituted styrenes,
alkyl, cycloalkyl, and aryl acrylates, such as methyl, ethyl, butyl, 2-ethylhexyl, or phenyl acrylates,
alkyl, cycloalkyl, alkenyl, or aryl methacrylates such as methyl, butyl, lauryl, cyclohexyl, allyl, 2-ethylhexyl, or phenyl methacrylates, and
vinylpyridine.

According to a preferred embodiment said filamentous polymeric particles are obtained:
in aqueous medium during the synthesis of said block copolymers, formed by heating the reaction medium at a temperature of 60 to 120° C.,
using a water-soluble macro-initiator,
the percentage of the molar mass of the water-soluble macro-initiator in the final block copolymer being between 10% and 30%, and
the degree of conversion of the hydrophobic monomer being at least 50%,
the hydrophobic monomer being selected from vinylaromatic monomers, and
optionally a crosslinking comonomer being used, the crosslinking monomer including divinylbenzenes, trivinylbenzenes, allyl (meth)acrylates, diallyl maleate, polyol (meth)acrylates, alkylene glycol di(meth)acrylates which have from 2 to 10 carbon atoms in the carbon chain, 1,4-butanediol di(meth)acrylates, 1,6-hexanediol di(meth)acrylates, and N, N'-alkylenebisacrylamides.

These hydrophobic monomers are added to the reaction medium which mainly comprises water.

The percentage of the molar mass of the water-soluble macro-initiator in the final block copolymer is preferably between 10 and 30 wt %.

Implementation of the method according to the invention produces filamentous polymeric particles in which the mass fraction of the hydrophilic moiety constituting the block copolymer is less than 25%.

According to one embodiment, when the reaction medium is admixed with a crosslinking agent, crosslinked filamentous particles are obtained. Said crosslinking agent is a crosslinking comonomer other than the aforementioned hydrophobic monomers.

A crosslinking comonomer is a monomer which, by virtue of its reactivity with the other monomers present in the polymerization medium, is capable of generating a covalent three-dimensional network. From a chemical view point, a crosslinking comonomer generally comprises at least two polymerizable ethylenic functions which, by reacting, are capable of producing bridges between a number of polymer chains.

These crosslinking comonomers may be capable of reacting with the unsaturated hydrophobic monomers during the synthesis of said particles.

The crosslinking comonomers include divinylbenzenes, trivinylbenzenes, allyl (meth)acrylates, diallyl maleate, polyol (meth)acrylates such as trimethylolpropane tri(meth)acrylates, alkylene glycol di(meth)acrylates which have from 2 to 10 carbon atoms in the carbon chain, such as ethylene glycol di(meth)acrylates, 1,4-butanediol di(meth)acrylates, 1,6-hexanediol di(meth)acrylates, and N,N'-alkylene-bisacrylamides, such as N,N'-methylene bisacrylamide. Preference will be given to using divinylbenzene or a dimethacrylate as crosslinking agent.

The filamentous particles according to the invention characteristically have a percentage of the molar mass of the hydrophilic macro-initiator in the final block copolymer of between 10 wt % and 50 wt %. As observed by Transmission Electronic Microscopy (TEM), these particles may take the form of cylindrical fibers with a length/diameter ratio of more than 100; their diameter is constant over their whole length and is greater than or equal to 5 nm, while their length is greater than 500 nm, preferably greater than 1 µm, advantageously greater than 5 µm, and, more preferably still, is greater than or equal to 10 µm. According to a preferred aspect, the filamentous polymeric particles are cylindrical fibers with a diameter ranging from 5 nm to 200 nm inclusive, a length ranging from 500 nm to 200 µm, preferably greater than 1 µm, advantageously greater than 5 µm, and, better still greater than or equal to 10 µm.

The filamentous particles according to the invention maintain their form and structure in a dispersed medium, independently of their concentration in the medium and/or of changes in its pH or its salinity.

According to a second embodiment, said filamentous particles are synthesized by radical polymerization by Reversible Addition Fragmentation Transfer (RAFT) in water in the presence of a macromolecular RAFT agent (or RAFT macroagent) which is hydrophilic.

Other additives can be added like shear thinning hydrosoluble polymers such as for example polysaccharides, guar, guar derivatives containing hydropropyl, hydroxypropyl, hydroxybutyl, carboxymethyl functions, copolymers containing acrylamide monomers, partially hydrolyzed polyacrylamide, (co)polymers containing (meth)acrylic monomers, oxygen scavengers, pH buffers, wetting agents, foamers, corrosion inhibitors, defoamers or antifoams, scale inhibitors, biocides, crosslinkers, gel breakers, non-emulsifiers, fluid loss control additives, clay stabilizers. A gas can also be injected to produce gas bubbles inside the fracturing fluid such as nitrogen and/or carbon dioxide.

A further subject of the invention is the use of the abovementioned compositions as stimulation fluids for oil, condensate and gas production, as hydraulic fracturing fluids, diverting fluids, conformance or permeability control fluids, sand control gravel pack placement fluid, acid fracturing fluids.

Surprisingly it has been discovered that the abovementioned filamentous polymeric particles previously used as shear thinning additive give solutions with water which are shear thinning and have a limited viscosity decrease at a shear under or equal to 1 $s^{-1}$ when the salt content increases up to saturation concentration or even the viscosity of which increases depending on the salt used. The saturation concentration is defined as the concentration where the first crystals of solid salt appear. These viscosity variations are also of value for salt concentrations below saturation like for example 10 wt % to 40 wt %.

The low sensitivity of the viscosity to variations of salinity at low shear rates (for example below 1 $s^{-1}$) for the solution containing the filamentous polymeric particles makes it possible to increase the salt content, such as for example NaCl, KCl, $CaCl_2$, $BaCl_2$, and ammonium salts in the hydraulic fracturing fluid while keeping a shear thinning behaviour. Furthermore, the density of the fluid is increased which increases the pressure in the subterranean formation at constant pumping power and hence the fracturing efficiency.

Moreover, as the formation water may have different salinities at different locations of a same subterranean reservoir and as the formation water mixes with the hydraulic fracturing fluid thereby modifying its salinity and as the salinity has a lower impact on the new hydraulic fracturing fluid viscosity at low shear rates (for example below 1 $s^{-1}$) than for conventional fluids, then the viscosity of the new fracturing fluid has a lower reduction and hence the ability of the new hydraulic fracturing fluid to transport proppants inside the fractures is greater and the fractures are kept open wider or this reduces the amount of water and fracturing additives necessary to deliver the same output of hydrocarbons.

This lower sensitivity or reversed sensitivity (in case of viscosity increase upon salt addition) also makes it possible to reuse the flow back water which is a mixture of hydraulic fracturing fluid and formation water for following fracturing operations, that is as a true recycling operation:

1—for example starting from an amount of salt in the fracturing fluid close to the estimated formation water salt content, the viscosity of the flow back fluid will decrease essentially due to dilution of shear thinning additive. It is then necessary to add the lacking concentration of shear thinning additive. In the case of a hydraulic fracturing fluid of the prior art, as the viscosity decreases because of the increase of salt content and dilution by water, the relative lacking concentration is higher.

2—for example starting from an amount of salt in the fracturing fluid lower than the estimated formation water salt content, and using a shear thinning additive having an inverse sensitivity to salt, the viscosity of the flow back fluid will decrease due to dilution of the shear thinning additive. But this effect will be limited due to the increase in salt content coming from the formation water.

The reuse of the flow back water without separating contaminants such as salts is beneficial from several points of view: less energy is used and these contaminants stay at the fracturing site or below, thereby limiting the dissemination due to hauling. As such, another subject of the present invention is the use of an aqueous composition extracted through a well from a subterranean formation for the preparation of a composition of the present invention for the preparation of a hydraulic fluid for subterranean formation fracturation.

In the case of diverting fluids, conformance or permeability control fluids, sand control gravel pack placement fluid, acid fracturing fluids, there is the same advantage in terms of efficiency for a shear thinning fluid (containing gravel in the case of sand control gravel pack placement fluid) the viscosity of which at low shear rate (0.1 $s^{-1}$ to 1 $s^{-1}$) decreases more slowly than the viscosity of existing fluids or even increases when its salt content increases up to 30 wt % with the salts typically found in formation water, at constant concentration of the shear thinning additive.

Another subject of the invention relates to a hydraulic fracturing fluid, diverting fluid, conformance fluid, permeability control fluid, sand control gravel pack placement fluid, acid fracturing fluid containing a composition of the present invention as herein before described. The invention also relates to the use of a composition of the present invention as herein before described, as hydraulic fracturing fluid, as well as a process for subterranean formation fracturation using said composition according to the present invention.

The invention is further illustrated by the following examples which do not aim at limiting the sought scope of protection.

Example 1: Preparation of Filamentous Polymeric Particles EG227 and ECLR5-13.06

This example details the synthesis of a living copolymer poly(methacrylic acid-co-sodium styrene sulfonate) used as macro-initiator, controlling agent and stabilizer for synthesis of hairy particles as crosslinked fibrillar micelles of block copolymer poly(methacrylic acid-co-sodium styrene sulfonate)-b-poly(n-butyl methacrylate-co-styrene). This amphiphilic copolymer is synthesized in a one-pot reaction.

Macro-initiator synthesis conditions can be changed (during polymerization, sodium styrene sulfonate concentration and pH) to adapt and change the macro-initiator composition.

For that, a blend containing 6.569 g of methacrylic acid (0.84 mol·$L_{aq}^{-1}$ or 0.79 mol·$L^{-1}$), 1.444 g of sodium styrene sulfonate (6.97×$10^{-2}$ mol·$L_{aq}^{-1}$ or 6.51×$10^{-2}$ mol·$L^1$ so $f_{0,SS}$=0.076;

$$f_{0,SS} = \frac{n_{SS}}{(n_{SS} + n_{MAA})}),$$

0.3594 g of $Na_2CO_3$ (3.75×$10^{-2}$ mol·$L_{aq}^{-1}$ or 3.50×$10^{-2}$ mol·$L^{-1}$) and 87.1 g of demineralised water is placed under $N_2$ flux at room temperature during 15 min. In parallel, 0.3162 g (9.18×$10^{-3}$ mol·$L_{aq}^{-1}$ or 8.57×$10^{-3}$ mol·$L^{-1}$) of alkoxyamine BlocBuilder® MA (Arkema) is solubilised in 3.3442 g of 0.4 M sodium hydroxide solution (1.6 equivalent vs BlocBuilder® MA methacrylic acid units) and bubbled with $N_2$ during 15 min.

BlocBuilder®-MA (a)

SG1 nitroxide

BlocBuilder®-MA solution is introduced into a reactor at room temperature under 250 rpm stirring. Monomer solution is slowly introduced into the reactor. Reactor pressure is adjusted at 1.1 bar with $N_2$ and still under stirring. Time t=0 is fixed when temperature is at 60° C. Temperature is at 65° C. after 15 min. During this reaction, in a Erlenmeyer flask, there are introduced 18.01 g of n-butyl methacrylate and 2.01 g of styrene (solid content=24%) and the mixture is placed under $N_2$ flux at room temperature during 10 min.

After 15 min of synthesis, that means, synthesis of poly(methacrylic acid-co-sodium styrene sulfonate)-SG1 macro-initiator, a second reactive system containing hydrophilic monomers is introduced under room pressure and 3 bar $N_2$ pressure and 205 rpm stirring are applied. Temperature is fixed at 90° C. for the polymerization.

After 54 min, 2.06 g of ethylene glycol dimethacrylate ($f_{0,EGDmA}$=0.066 mol) (where $$f_{0,EGDMA} = \frac{n_{EGDMA}}{(n_{EGDMA} + n_{MABu} + n_{Sty})})$$

(solid content=25%) are introduced into the reactor for fiber crosslinking after their formation.

Samplings are realised at regular times to determine polymerization kinetic by gravimetry.

Table 1 presents characteristics of a latex sample prepared during the second step of nanoparticle synthesis.

TABLE 1

| Time (h) | Conversion (%) | pH |
|---|---|---|
| 0.25 | 6.4 | — |
| 0.58 | 34.6 | 4.41 |
| 0.9 | 66.1 | — |
| 1.25 | 88.7 | — |
| 3.0 | 94.9 | 4.54 |

Fiber diameters measured by Transmission electronic microscopy TEM (ImageJ software) is 45.3 nm. This microscope is JEOL 100 Cx II 100 keV with high resolution camera CDD Camera Keen View from SIS.

Rheological tests: solutions of filamentous polymeric particles are prepared at 40° C. using tap water and different salts. First the salt is introduced in tap water and then the polymer solution resulting from the synthesis. The mixture is gently agitated at 40° C. for 60 min. Then the mixture is poured into a Couette device (air gap 2 mm) of a MCR301 Anton Paar rheometer and allowed to equilibrate at 20° C. Then the mixture is sheared starting at $10^{-2}$ $s^{-1}$ and finishing at $10^3$ $s^{-1}$.

In all the examples below, the dosage of polymer indicated is the dosage of the polymer without the water coming from the synthesis.

Example 2: Water Composition Containing 5 wt % Non-Crosslinked Filamentous Polymeric Particles Aqueous non-crosslinked filamentous polymeric particle solution EG216 synthesis follows the same procedure (see example 1) as crosslinked particles but without crosslinking agent.

Figure 1:
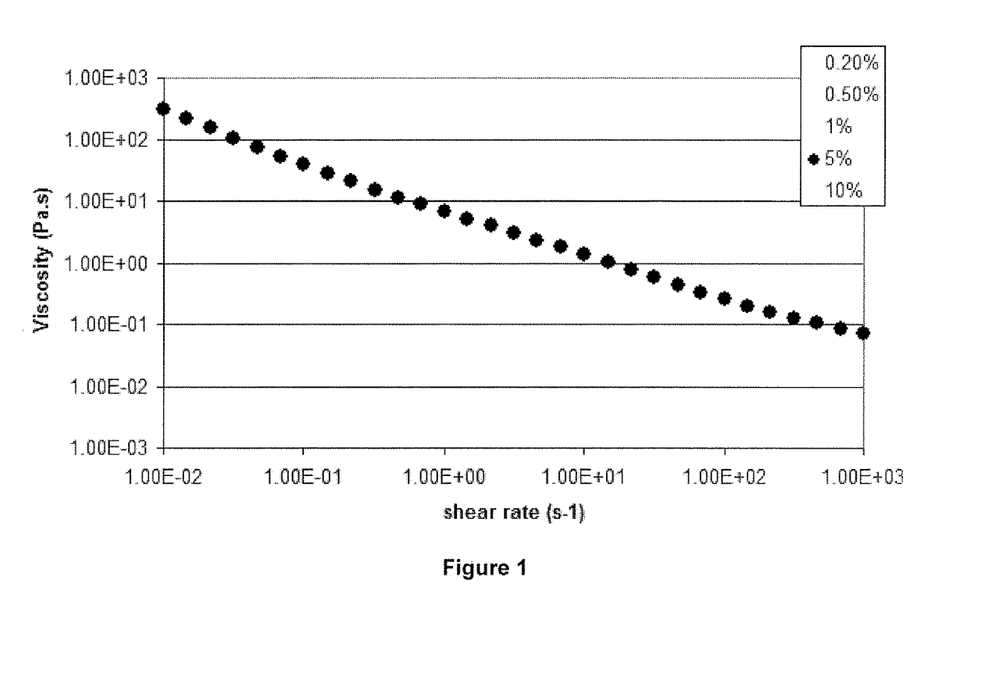
FIG. 1 is a plot of viscosity as a function of shear rate for a composition made according to Example 2.

The composition is shear thinned as shown on FIG. 1.

Example 3: Water Composition Containing 5 wt % Non-Crosslinked Filamentous Polymeric Particles with KCl Compared with FIG. 8 of US2007213232

Aqueous non-crosslinked filamentous polymeric particle solution EG216 synthesis follows the same procedure (see example 1) as crosslinked particles but without crosslinking agent.

Rheological tests are run as described above. The results are presented in Table 2 below:

TABLE 2

| KCl content (wt %) | Viscosity at 1 $s^{-1}$ with EG216 at 5% at 20° C. (cPo) | Comparative: viscosity at 1 $s^{-1}$ with EHAC/IPA 4.5% in water at 40° C. (US2007213232) (cPo) |
|---|---|---|
| No addition, tap water | 6690 | <300 |
| 1% | 5460 | 6000 |
| 4% | 3750 | 22000 |
| 12% | 2160 | — |

The composition with 5 wt % EG216 is less sensitive to KCl than the 4.5 wt % EHAC/IPA mixture. In the case of 4.5 wt % EHAC/IPA the viscosity starts decreasing at a dosage above 3 wt % KCl.

Example 4: Water Compositions Containing 5 wt % Non-Crosslinked Filamentous Polymeric Particles without or with CaCl$_2$ or with BaCl$_2$ Aqueous non-crosslinked filamentous polymeric particle solution ECL 13-04 is prepared in the same manner as EG 216 above.

Rheological tests are run as described above. The results are presented in Table 3 below:

TABLE 3

| Composition | Viscosity (Pa · s) at 0.1 s$^{-1}$ |
|---|---|
| 5% EG227 in tap water | 12 |
| 5% EG227 + 1% BaCl$_2$ + tap water | 20 |
| 5% EG227 + 12% BaCl$_2$ + tap water | 19 |
| 5% EG227 + 40% CaCl$_2$ + tap water | 13 |

Surprisingly, ECL 13-04 makes it possible to keep constant or increase the viscosity at low shear rate with amounts up to 40% of salt, depending on the salt. This effect is not taught or even suggested by WO 2012/085415 and WO 2012/085473.

Example 5: Water Composition Containing 5 wt % Crosslinked Filamentous Polymeric Particles with 4% KCl and 15% Ethylene Diamine Tetracetic Acid (EDTA)

Figure 2:
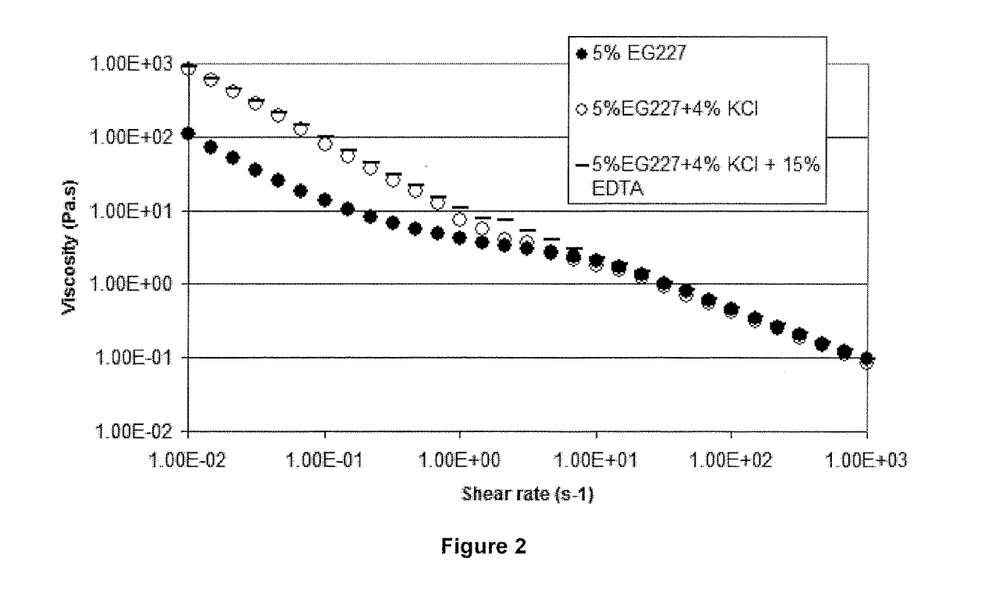
FIG. 2 is a plot of viscosity as a function of shear rate for a composition made according to Example 5.

EG227 can be considered as a covalent polymer because of the crosslinking, like guar and its derivatives. Surprisingly the viscosity of EG227 increases with the addition of a salt contrary to what is taught in US2009111716 about polyelectrolytes. The compositions are shear thinning, the low shear rate viscosity increases with 4% KCl and is independent of the presence of the scale inhibitor EDTA, as shown on FIG. 2

Example 6: Water Compositions Containing 0.3 wt % Crosslinked Filamentous Polymeric Particles from the Aqueous Composition ECLR5-13.06, or with KCl, Compared to US2009111716

Rheological tests are run as described above. The results are presented in Table 4 below:

TABLE 4

| Composition | Viscosity (Pa · s) at 0.1 s$^{-1}$ |
|---|---|
| 0.3% ECLR5-13.06 in tap water | 0.11 |
| 0.3% ECLR5-13.06 + 5% KCl + tap water | 0.57 |
| 0.3% anionic guar in tap water (US2009111716, FIG. 8) | 0.45 |
| 0.3% anionic guar + 5% KCl + tap water (US2009111716, FIG. 8) | 0.09 |
| 0.3% anionic guar + 2% BET-O-30 + 5% KCl + tap water (US2009111716, FIG. 8) | 0.35 |

The anionic guar is useful with tap water for producing a hydraulic fracturing fluid that suspends solids. But once this fluid has come into contact with a salted subterranean formation water, it can lose its viscosity because of the salt increase (−75% if the KCl concentration is 5 wt % in the water) and dilution with water and hence a part of its ability to transport proppants in areas with such a salt content. By contrast and surprisingly with ECLR5-13.06 the viscosity is multiplied by 5 with the addition of 5% KCl, so the risk of losing its ability to transport proppants is lower because it depends only on the dilution of the polymer by water. This solution is better than the addition of BET-O-30 because it avoids the handling of one more chemical and the viscosity is higher at a lower dosage.

Example 7: Water Composition Containing 5 wt % Crosslinked Filamentous Polymeric Particles from the Aqueous Composition ECLR5-13.06 and BaCl$_2$ or CaCl$_2$ Rheological tests are run as described above. The results are presented in Table 5 below:

TABLE 5

| Composition in tap water | 5% ECLR5-13.06 | 5% ECLR5-13.06 + 1% CaCl$_2$ | 5% ECLR5-13.06 + 4% CaCl$_2$ | 5% ECLR5-13.06 + 12% CaCl$_2$ | 5% ECLR5-13.06 + 40% CaCl$_2$ |
|---|---|---|---|---|---|
| Viscosity (Pa · s) at 0.1 s$^{-1}$ | 66 | 160 | 100 | 181 | 100 |

| Composition | 5% ECLR5-13.06 | 5% ECLR5-13.06 + 1% BaCl$_2$ | 5% ECLR5-13.06 + 4% BaCl$_2$ | 5% ECLR5-13.06 + 40% BaCl$_2$ |
|---|---|---|---|---|
| Viscosity (Pa · s) at 0.1 s$^{-1}$ | 66 | 191 | 199 | 634 |

Surprisingly the viscosity with 5% ECLR5-13.06 and 40% of CaCl$_2$ or BaCl$_2$ is above that in tap water. It makes it possible to carry out hydraulic fracturing in areas with high salinities, that is above 5% of total dissolved solids, more preferentially above 10% of total dissolved solids. What's more, it facilitates the use of the flow back water which often has a high salinity and which is pumped back to the surface after a fracturing operation. Indeed its high salinity is not detrimental for use as a novel hydraulic fracturing fluid with the filamentous polymeric particles of the invention. Hence surface water is spared and replaced by formation water in the hydraulic fracturing fluid.

ABBREVIATIONS

AA: acrylic acid
CRP: controlled radical polymerization
DMF: dimethylformamide
DMSO: dimethyl sulfoxide
EDGMA: ethylene glycol dimethacrylate
MAA: methacrylic acid
MABu: n-butyl methacrylate
TEM: transmission electron microscopy
P4VP: poly(4-vinylpyridine)
PEGA: poly(ethylene glycol) methyl ether acrylate
PNaA: poly(sodium acrylate)
RAFT: polymerization by addition fragmentation (Reversible Addition Fragmentation chain Transfer)
SG1: N-tert-butyl-N-[1-diethylphosphono(2,2-dimethylpropyl)]
S or Sty: styrene
SS: sodium styrenesulfonate
n: number of moles
rpm: revolutions per minute
$f_{0,sty}$: initial molar fraction of styrene in the mixture of monomers
$f_{0,SS}$: initial molar fraction of sodium sulfonate in the mixture of monomers
$f_{0,DVB}$: initial molar fraction of divinylbenzene in the mixture of monomers
$f_{0,EGDMA}$: initial molar fraction of ethylene glycol dimethacrylate in the mixture of monomers
BlocBuilder®-MA is (N-(2-methylpropyl)-N-(1-diethylphosphono-2,2-dimethylpropyl)-O-(2-carboxylprop-2-yl) hydroxylamine, available at Arkema.

What is claimed:

1. A composition comprising water, dissolved salts, filamentous polymeric particles and solids particles other than the filamentous polymeric particles, wherein the filamentous polymeric particles are cylindrical fibers with a diameter ranging from 5 nm to 200 nm inclusive and a length ranging from 500 nm to 200 μm and consist of block copolymers synthesized by controlled radical emulsion polymerization.

2. A composition according to claim 1, further comprising dissolved acids.

3. A composition according to claim 1, wherein the filamentous polymeric particles consist of block copolymers prepared by controlled radical emulsion polymerization performed using at least one hydrophobic monomer in the presence of water and a water-soluble macro-initiator derived from a nitroxide, or synthesized by radical polymerization with Reversible Addition Fragmentation Transfer (RAFT) performed using at least one hydrophobic monomer in the presence of water and a water-soluble macromolecular RAFT agent.

4. A composition according to claim 1, wherein the salts include monovalent and/or divalent and/or trivalent ions.

5. A composition according to claim 1 wherein the weight percentage of filamentous polymeric particles compared to the weight of the composition without the solid particles other than the filamentous polymeric particles is between 0.05% and 20% and the weight percentage of dissolved salts ranges from 0.1% to salt saturation concentration.

6. A composition according to claim 1, further comprising at least one additional component selected from the group consisting of oxygen scavengers, pH buffers, wetting agents, foamers, corrosion inhibitors, defoamers and antifoams, scale inhibitors, biocides, crosslinkers, gel breakers, non emulsifiers, fluid loss control additives, and injected gas bubbles.

7. A hydraulic fracturing fluid, diverting fluid, conformance fluid, permeability control fluid, sand control gravel pack placement fluid, or acid fracturing fluid containing the composition of claim 1.

8. A method comprising using the composition of claim 1 as a hydraulic fracturing fluid.

9. A method of preparing a fluid according to claim 7 comprising using an aqueous composition extracted through a well from a subterranean formation.

10. A process of fracturation of a subterranean formation comprising using a composition according to claim 1.

* * * * *